United States Patent [19]

Trout et al.

[11] Patent Number: 4,933,232
[45] Date of Patent: Jun. 12, 1990

[54] ISOCYANATE-CARBOXYL GROUP-CONTAINING FATTY COMPOUNDS FOR MANUFACTURE OF LIGNOCELLULOSIC COMPOSITES

[75] Inventors: Kenneth G. Trout, Tampa; George A. Grozdits, St. Petersburg; Ernest K. Moss, Clearwater; James F. Daly, St. Petersburg, all of Fla.

[73] Assignee: Jim Walter Research Corp., St. Petersburg, Fla.

[21] Appl. No.: 222,469

[22] Filed: Jul. 21, 1988

Related U.S. Application Data

[63] Continuation of Ser. No. 935,903, Nov. 28, 1986, Pat. No. 4,772,442.

[51] Int. Cl.$^5$ .............................................. B32B 27/00
[52] U.S. Cl. .................................... 428/288; 264/109; 428/326; 428/402; 428/407; 428/425.1; 528/52
[58] Field of Search ............... 428/288, 326, 402, 407, 428/425.1; 264/109; 528/52

[56] References Cited

U.S. PATENT DOCUMENTS

| | | | |
|---|---|---|---|
| 3,505,250 | 4/1970 | Saunders | 260/2.5 |
| 3,726,952 | 4/1973 | Boden et al. | 264/48 |
| 4,110,397 | 8/1978 | Wooler | 264/338 |
| 4,111,861 | 9/1978 | Godlewski | 521/123 |
| 4,254,228 | 3/1981 | Kleimann et al. | 521/123 |
| 4,376,088 | 3/1983 | Prather | 264/109 |
| 4,396,673 | 8/1983 | Ball et al. | 428/326 |
| 4,409,351 | 10/1983 | Lee | 524/322 |
| 4,431,455 | 2/1984 | Brown et al. | 106/245 |
| 4,451,425 | 5/1984 | Meyer | 264/300 |
| 4,490,517 | 12/1984 | Fuzesi et al. | 527/401 |
| 4,490,518 | 12/1984 | Fuzesi et al. | 527/401 |
| 4,498,929 | 2/1985 | Robertson | 106/38.2 |
| 4,499,254 | 2/1985 | Dominguez et al. | 528/49 |
| 4,528,153 | 7/1985 | Scholl et al. | 264/109 |
| 4,528,154 | 7/1985 | Nguyen et al. | 264/109 |
| 4,581,387 | 4/1986 | Werner et al. | 521/128 |
| 4,609,513 | 9/1986 | Israel | 264/122 |

FOREIGN PATENT DOCUMENTS

| | | |
|---|---|---|
| 60766 | 9/1973 | Australia . |
| 1653178 | 7/1966 | Fed. Rep. of Germany . |
| 58-36430 | 3/1983 | Japan . |

OTHER PUBLICATIONS

Proceedings of 11th Washington State University Symposium on Particleboard, 3/1977, pp. 22–24.
Schneberger, G. L., et al., "Mold Release Agents. I. Fatty Acids and Selected Fluorinated Compounds as Releasants for Polyurethane from Cold Rolled Steel," Polymer Engineering and Science, May, 1981, vol. 21, No. 7, pp. 381–384.
The Condensed Chemical Dictionary, 10th Edition, p. 1094.

Primary Examiner—Marion C. McCamish
Attorney, Agent, or Firm—Charles W. Vanecek; James W. Grace

[57] ABSTRACT

A binder/release system for the preparation of molded articles, especially lignocellulosic composites, which utilizes in combination with isocyanate-based binders a fatty material as an internal and/or external release agent, the fatty material being at least one polymerized fatty acid and/or at least one polycarboxyl compound containing a polymeric fatty radical(s).

11 Claims, No Drawings

ISOCYANATE-CARBOXYL GROUP-CONTAINING FATTY COMPOUNDS FOR MANUFACTURE OF LIGNOCELLULOSIC COMPOSITES

This is a continuation of application Ser. No. 935,903, filed Nov. 28, 1986, now U.S. Pat. No. 4,772,442.

FIELD OF THE INVENTION

This invention relates to an improved process for producing molded particulate articles, especially lignocellulosic composites, by utilizing a polymeric fatty acid or fatty radical-containing component/polyisocyanate combination as a binder/release system.

DESCRIPTION OF THE PRIOR ART

Pressed objects such as chip boards, composite panels and other shaped articles are usually produced by hot pressing the inorganic or organic raw material, such as a composition of wood shavings, wood fibers or another material containing lignocellulose, with binders such as aqueous dispersions or solutions of urea/formaldehyde or phenol/formaldehyde resins. It is also known to use polyisocyanates as binder for pressed panels instead of conventional binders. The use of polyisocyanates as binders improves the stability and the moisture-resistance of the products and improves their mechanical properties.

The large scale production of articles which are bonded with polyisocyanates, in particular articles containing lignocellulose such as chip boards, fiber boards, particle boards, flake boards, wafer boards, oriented strand boards or plywood is, however, impaired by the marked adhesiveness of the polyisocyanates to molding metal surfaces. This adhesiveness, after the hot pressing treatment, causes the molded articles to adhere strongly to metal press plates, in particular the steel or aluminum surfaces of the press. Such adhesion thus makes it difficult to remove the molded articles from the mold. A forced removal damages the molded articles and leaves remnants on the mold requiring its periodic cleanup.

Various attempts have been made to overcome this adhesion problem without sacrificing other desirable board properties. Conventional release agents such as oils, wax emulsions, metallic soaps, wax polishes, silicones and polytetrafluoroethylene have been applied to caul plates or sprayed on the surface of the lignocellulosic mat prior to pressing. This results in buildup on the press surfaces. Similar release agents have also been added to the binder with mixed results.

U.S. Pat. No. 4,100,328 discloses the use of a polyether polyol-organic polyisocyanate binder composition for bonding cellulosic materials and eliminating sticking to mold faces. Unfortunately, in this binder composition a portion of the rather costly isocyanate component is replaced by polyols which themselves are relatively expensive materials. Also, this binder system involves use of a low isocyanate/polyol index (1-2) which results in precure after spraying on the substrate and before final curing. Weak boards are thus obtained.

It accordingly would be highly desirable if a binder/release system for board products could be prepared by combining an isocyanate with a relatively inexpensive reactive diluent and/or external release agent which significantly reduces the overall manufacturing cost of the system and contributes to the obtainment of desirable board properties, including superior strength, moisture resistance and release.

OBJECTS OF THE INVENTION

It accordingly is an object of the present invention to provide an improved binder/release system for the production of molded articles using polyisocyanates, especially synthetic boards from lignocellulosic and/or cellulosic materials, by using the isocyanate in combination with a relatively inexpensive component which may react with the isocyanate to form a portion of the binder as well as function as an internal and/or external release agent to ensure that the pressed articles can be separated from the molding surfaces without difficulty.

It is a further object of the present invention to provide a simple and economical process for producing a shaped article, especially a synthetic board product, through the use of the improved binder/release system of the invention, which exhibits superior adhesive characteristics in the shaped article and is particularly effective in minimizing unwanted adhesion to the molding means used in producing the article.

It is a still further object of the present invention to provide a molded article, especially a synthetic board such as a particle board, waferboard, oriented waferboard or oriented strand board, which has a combination of excellent properties, including superior strength, dimensioal stability and durability.

It is another object of the present invention to provide a low density synthetic board product having excellent properties, including superior strength.

These and other objects and advantages of the present invention will become more apparent to those skilled in the art from the following detailed description.

SUMMARY OF THE INVENTION

The above objects have been achieved in the process of the present invention for forming shaped articles by the hot pressing of a composition of a comminuted organic and/or inorganic raw material utilizing a binder/release system comprising a polyisocyanate and a polymeric fatty acid or fatty radical-containing component used as an internal and/or external release agent. The term "binder/release system" stems from the capacity of the fatty acid and fatty radical-containing compounds to beneficially modify both the binding and release characteristics of polyisocyanate binders. The binder system is used preferably for materials containing lignocellulose. The binder system can be used in the production of both interior and exterior grade synthetic board products and is especially useful in the manufacture of waferboard, particleboard and oriented strand board.

The polyisocyanate of the binder system may suitably by any organic polyisocyanate compound containing at least 2 active isocyanate groups per molecule, or mixtures of such compounds. Polyphenyl polyisocyanates, such as diphenylmethane-4,4'-diisocyanate and polymethylene polyphenyl polyisocyanates, are particularly suitable.

Employed with the polyisocyanate in the binder/release system of the invention is at least one polymerized fatty acid and/or at least one polycarboxyl compound containing a polymeric fatty radical(s). Polymerized fatty acids are chosen in particular from the group consisting of the dimers and trimers of unsaturated aliphatic monoacids containing from 8 to 24 carbon atoms and mixtures of these with one another. For example, the dimers and trimers of mixtures of oleic, linoleic and linolenic acids can be mentioned and, in particular, the dimerized and trimerized oleic acid fatty acids. The mixtures of fatty acids found in tall oil fatty acid are a preferred raw material source for the preparation of the polymeric fatty acids. The polymerized fatty acids may be chain extended by reaction with compounds having polyfunctional active hydrogen groups to yield higher equivalent weight polyacid for use in the binder/release system of the invention. The acid number of the polymerized fatty acids and polymeric fatty radical-containing compounds of higher equivalent weight are generally in the range from about 30–250.

The polymerized fatty acid and/or the polymeric fatty radical-containing compound may be used as a co-additive(s) with a polyisocyanate to form an internally releasing adhesive system which is particularly effective for the mold release of pressed articles, especially those based on raw materials containing lignocellulose. Alternatively, the press plates or the press molds or the surfaces of the isocyanate-treated particles may be coated with the co-additives which then will function as external release agents. The invention of course includes the conjoint use of the co-additives as both internal and external release agents.

If desired, other conventional binding agents, such as formaldehyde condensate adhesive resins, may be used in conjunction with the present binder system.

DETAILED DESCRIPTION OF THE INVENTION

The method of the present invention is suitable for processing cellulosic starting materials in general, and is particularly useful for forming wood particles into board products. Mixtures of cellulosic particles may be used. Typically, such materials are wood particles derived from wood and wood residues such as wood chips, wood fibers, shavings, veneers, wood wool, cork, bark, sawdust, and the like. Particles of other cellulosic material such as shredded paper, pulp or vegetable fibers such as corn stalks, straw, bagasse and the like, and of non-cellulosic materials such as shredded scrap rubber, polyurethane, polyisocyanurate and like cellular and non-cellular polymers can also be used. Inorganic materials such as hydrated alumina, gypsum, chopped mineral fibers and the like can also be employed, either alone or in combination with any of the above cellulosic or non-cellulosic materials, in the formation of pressed articles in accordance with the present invention.

The pressed article is produced according to the process of the invention by bonding together particles of suitable raw materials (e.g., wood or other cellulosic material) using heat, pressure and the binder/release system (polyisocyanate and co-additive) of the invention. The invention relates in one preferred embodiment to a process of preparing synthetic boards wherein cellulosic material is contacted with an improved internally releasing binder and the treated material is subsequently formed into boards by the application of heat and pressure, the improved binder comprising an organic polyisocyanate and a polymeric fatty acid or polycarboxyl compound containing a polymeric fatty radical. In another preferred embodiment, the fatty co-additive is used as an external agent and is applied to the surface of the blended composite (furnish and isocyanate) to be molded or the surface of the molding device. The fatty external release agents of the invention are applied to the surfaces to be protected in sufficient amount to minimize sticking of the binder. An effective amount can be readily determined by routine experimentation. For example, this amount typically will be at least 0.2 gm/board square foot in the production of lignocellulosic composites. The release agents can be applied by spraying, brushing, rolling or other known method. While the processes of the invention are particularly suitable for the manufacture of waferboard, oriented waferboard, particleboard, and oriented strand board, they are not limited in this respect and can also be used in the manufacture of medium density fiberboard, plywood, etc.

As mentioned above, the binder system may suitably contain any organic polyisocyanate containing two or more isocyanate groups. The polyisocyanates which may be employed include the aliphatic, cycloaliphatic and aromatic polyisocyanates, and combinations thereof. Representative of these types are the following: m- and p-phenylene diisocyanates, toluene-2,4- and 2,6-diisocyanates, diphenylmethane-4, 4-diisocyanate, 4-chloro-1,3-phenylene diisocyanate, napthalene-1,5-diisocyanate, diphenylene-4,4-diisocyanate, 3,3'-dimethyl diphenylmethane-4,4'-diisocyanate, 3-methyl-diphenylmethane-4,4'-diisocyanate, diphenylether diisocyanate, cyclohexane-2,4- and 2,3-diisocyanates, 1-methyl cyclohexyl-2,4- and 2,6-diisocyanates, bis-(isocyanatocyclohexyl-)methane, 2,4,6-triisocyanatotoluene, 2,4,4-tri-isocyanatodiphenyl ether, polymethylene polyphenyl polyisocyanates, methylene diphenyl diisocyanate, triphenylmethane triisocyanate, 3,3'-ditolylene-4,4-diisocyanate, 4,4'-methylenebis (2-methyl-phenyl isocyanate), hexamethylene diisocyanate, and cyclohexylene-1,3- and 1,2-diisocyanates. Preferred polyisocyanates are polymethylene polyphenyl polyisocyanates.

The binder/release system of the present invention utilizes polymeric fatty acids and/or polycarboxyl compounds containing polymeric fatty radicals. The term "polymeric fatty acid" refers to polymerized fatty acids. The term "polymeric fatty radical" refers to the hydrocarbon radical of a polymerized fatty acid, and is generic to the divalent, trivalent, and other polyvalent hydrocarbon radicals of dimerized fatty acids, trimerized fatty acids and higher polymers of fatty acids. The divalent and trivalent hydrocarbon radicals are referred to herein as "dimeric fatty radical" and "trimeric fatty radical," respectively. The term "fatty acids" is intended to include saturated, ethylenically unsaturated and acetylenically unsaturated naturally occurring and synthetic monobasic aliphatic acids containing from 8–24 carbon atoms.

The saturated, ethylenically unsaturated, and acetylenically unsaturated fatty acids are generally polymerized by somewhat different techniques, but because of the functional similarity of the polymerization products, they all are generally referred to as "polymeric fatty acids."

Saturated fatty acids are difficult to polymerize but polymerization can be obtained at elevated temperatures with a peroxidic catalyst such as di-t-butyl peroxide. Because of the generally low yields of polymeric products, these materials are not currently commercialy significant. Suitable saturated fatty acids include branched and straight chain acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched or straight chain, poly- and mono-ethylenically unsaturated acids such as 3-octenoic acid, 11-dodecenoic acid, linderic acid, laurileic acid, myristoleic acid, tsuzuic acid, palmitoleic acid, petroselinic acid, oleic acid, elaidic acid, vaccenic acid, eleostearic acid, hiragonic acid, moroctic acid, timnodonic acid, eicosatetraenoic acid, nisinic acid, scoliodonic acid and chaulmoogric acid.

The acetylenically unsaturated fatty acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fatty acid, both straight chain and branched chain, both mono-unsaturated and poly-unsaturated, are useful monomers for the preparation of the polymeric fatty acids. Suitable examples of such materials include 10-undecynoic acid, tariric acid, stearolic acid, behenolic acid, and isamic acid.

Because of their ready availability and relative ease of polymerization, oleic and linoleic acid are the preferred starting materials for the preparation of the polymeric fatty acids. Generally mixtures of these fatty acids from wood pulping operations (tall oil) or from vegetable oils (soybean, corn, cottonseed, etc.) provide raw material for dimer and trimer acid production.

Typical compositions of commercially available polymeric fatty acids are based on unsaturated $C_{18}$ fatty acids and include:

|  | Percent by wt. |
|---|---|
| $C_{18}$ monobasic acids ("monomer") | 0–15 |
| $C_{36}$ dibasic acids ("dimer") | 50–96 |
| $C_{54}$ (and higher) ("trimer") polybasic acids | 4–35 |

Commercially available polymeric fatty acids may be used "as is." However, it may be preferable to utilize purified fractions, that is, fractions rich in dimeric fatty acid content, obtained, for example, by conventional techniques of distillation or solvent extraction. They may be hydrogenated (before or after distillation) to reduce unsaturation under hydrogen pressure in the presence of a hydrogenation catalyst.

It is known that an isocyanate reacts with an organic carboxylic acid as follows:

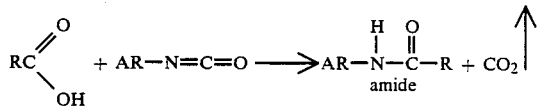

The reaction products formed are a mole of an amide and a mole of $CO_2$ gas for each mole of acid consumed. Without postulating any particular explanation for the superior performance of the binder/release system of the invention, it is theorized that mold release is benefitted by generation of wax-like fatty acid amide as the isocyanate binder reacts. In addition, it is speculated that formation of an inert gaseous biproduct aids board separation from the pressing surface through the creation of a gaseous interface.

Japanese Publication No. 83-36430 discloses the use of monofunctional carboxylic acids with 8 to 28 carbon atoms in isocyanate binders. This internal use of monofunctional acids results in chain termination, with the monoacids only participating in mold release by blocking the useful and expensive isocyanate component. On the other hand, the use of polyfunctional fatty acids permits the formation of polymeric reaction products by chain extension. Polymeric fatty acids thus can yield higher molecular weight backbones in the reaction products and accompanying improved binding properties in the molded articles. Multifunctional fatty acids not only retain in the molding operation the "greasy," releasing properties imparted by the monofunctional fatty acids but also participate in polymer formation yielding pressed articles with properties, e.g., internal bond strength, which are superior to those attainable with the monofunctional acids.

Use of the multifunctional fatty acids as external release agents reduces buildup on the press platens because they react with the surface isocyanate and remain a part of the molded product. In addition, the surface reaction generates additional polymer to strengthen the board whereas monofunctional acids give chain termination.

In waferboard manufacturing, use of the multifunctional fatty acids as external release agents eliminates the board surface flaking caused by the occasional flip-overs of the wafers between external release agent application and hot press closing. When conventional release agents are used, a wafer flip-over will cause wafer sticking to the press because on the exposed wafer surface the polyisocyanate is unprotected, and will prevent wafer adherence to the board because the inner wafer surface is covered with soap or wax to prevent sticking. In the case of the present fatty acid release agents, a flip-over can only result in sticking to the press. However, this sticking is lessened by the wafer's adherence to the board and, due to the continuity of the board surface structure, the wafer will tend to be pulled off the press.

The binder/release system of the invention also includes polycarboxyl compounds which are obtained by reaction of the polymeric fatty acids with appropriate amounts of chain extending chemical compounds having polyfunctional active hydrogen groups which are reactive with the carboxyl groups of the fatty acids. Any compound having at least two such groups, such as polyalcohols, polyamines and aminoalcohols, can be used in the chain extension. Examples of a chain extending reactant(s) for yielding a polyfunctional acid having increased molecular weight are at least one glycol, such as diethylene glycol; at least one diamine, such as a dimer acid diamine; or a combination of at least one dicarboxylic acid, dicarboxylic acid anhydride, or dicarboxylic acid ester (e.g., phthalic anhydride or other aromatic-based acid or acid derivative) and at least one glycol and/or diamine. The higher molecular weight polyfunctional acids can be formulated to have a low viscosity for convenient spray application to the particles to be bonded, and are found to contribute to high bond strength in the resulting pressed articles.

The following synthetic scheme for preparing these polyacids having high equivalent weight and readily handleable viscosity involves the reaction of phthalic anhydride, diethylene glycol and a polymeric fatty acid which may be represented by the formula

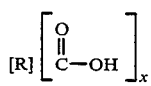

where R is the hydrocarbon group (e.g., a dimeric fatty radical or a trimeric fatty radical) of the polymeric fatty acid and x is 2 to about 4.

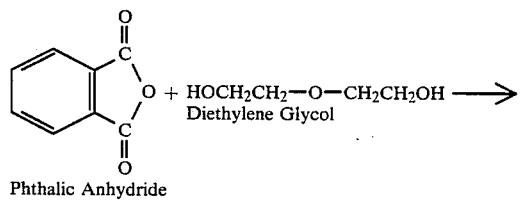

Phthalic Anhydride

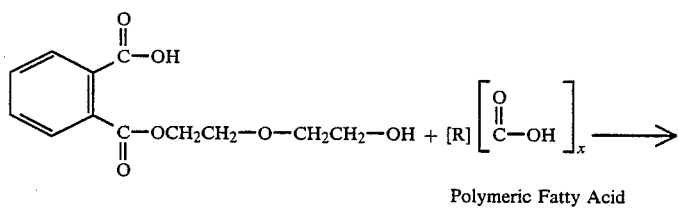

Polymeric Fatty Acid

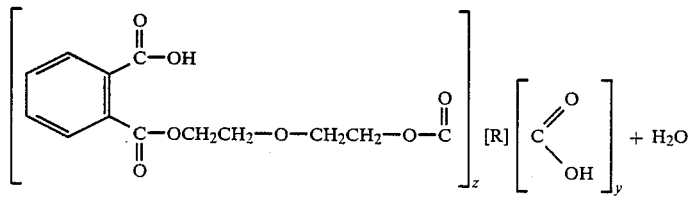

Polyfunctional Carboxylic Acid where $y+z=x$.

In the preparation of the extended polycarboxylic acids of the invention, the acid equivalents are advantageously in excess relative to the equivalents of the other active hydrogen group-containing compounds present so as to provide sufficient carboxyl end groups for enhanced mold release. The chain extension reaction is suitably conducted to provide a workable viscosity, which may be beneficially modified by heat, for good distribution on the particulate material to be bonded. The viscosity in cps at 25° C. of the extended polyacid is generally less than about 15,000.

In the internal binder/release composition of the invention, the equivalent ratio or binder index of polyisocyanate to polymeric fatty acid and/or polymeric fatty radical-containing polycarboxyl component is generally about 20:1 to 2:1, preferably 12:1 to 4:1. The quantity of this composition needed in a particular board-forming process can be determined by simple experimentation. An application of from about 0.5 to 25%, perferably 1.5 to 9% of total composition, solids basis, may generally be employed. If desired, other standard materials, such as fire retardants, pigments, catalysts, additional internal or external release agents, water-repellants (e.g., sizing agents), etc., may also be applied.

The process of the invention utilizing an internal release agent is readily carried out by applying the organic polyisocyanate and the fatty material, i.e., the polymeric fatty acid and/or polymeric fatty radical-containing polycarboxyl component, to the wood particles in any suitable manner, such as by spraying, and then subjecting the treated material to heat and pressure. Before the compression molding step, the wood particles and binder are desirably blended together in a suitable mixing machine, e.g., a rotary blender. The board formation is suitably accomplished in a heated press between caul plates. The internally releasing binder composition of the invention is suitably applied to moist wood particles which are generally at a moisture content of about 0-25%, and preferably of about 5-10%, based on the dry weight of the wood particles. In the production of multilayered boards, use of the fatty material may profitably be restricted to the outermost layers.

The fatty material may be applied before, simultaneously with, or after the polyisocyanate. The polyisocyanate and fatty material may advantageously be premixed immediately or fairly close in time before their application to the wood particles. This simplifies application and avoids excessive viscosity buildup prior to application to the substrate. This premixing also places the reactive release agent in close proximity to the isocyanate to attain the maximum amide formation for release potential. In another preferred embodiment of the invention, the fatty material is applied after the polyisocyanate.

The isocyanate binder system of the invention may further be modified by partially or totally replacing the fatty material by another internal reactive diluent for the isocyanate. In the case of total replacement, the fatty material of the invention is employed as an external release agent in the overall binder/release system. The additional reactive diluents suitably comprise compounds having at lest one active hydrogen-containing group, and preferably at least two such groups which are reactive with the isocyanate group. Polyether and polyester polyols are preferred diluents. Especially preferred polyester polyols are aromatic compounds, such as those described in U.S. Pat. No. 4,609,513 and U.S. patent application Nos. 912,894 and 912,889, the disclosures of which are hereby incorporated by reference.

The fatty material, whether used as an internal or external release agent, and the polyisocyanate may be applied in the form of a solution or dispersion, or may be applied neat. When the binder components are employed in the form of an aqueous emulsion or dispersion, the aqueous emulsion or dispersion can be prepared using any of the suitable techniques known in the art, prior to use of the components. Illustratively, the fatty material is dispersed in water in the presence of an emulsifying agent and the resultant emulsion is applied as an external release agent to the mold surfaces and/or the surfaces of the isocyanate binder-treated particles.

Pressing times, temperatures and pressures vary widely depending on the thickness of the board produced, the desired density of the board, the size and type of the particles used, and other factors well known in the art.

Another embodiment of the invention involves the use of monomeric fatty acids as external release agents in the production of isocyanate-bonded molded articles. The monomeric fatty acids are suitably aliphatic monocarboxylic acids having 8 to 28 carbon atoms, and preferably have about 12 to 22 carbon atoms. The monomeric fatty acids include, for example, lauric acid, caprylic acid, capric acid, myristic acid, palmitic acid, oleic acid, stearic acid, arachidonic acid, behenic acid, etc. These fatty acids may be applied neat or in the form of a solution or dispersion to the molding surfaces and/or the surfaces of the isocyanate-treated moldable particles, which preferably comprise materials containing lignocellulose.

The invention is further illustrated by the following examples in which all parts and percentages are by weight unless otherwise indicated.

In Examples 1 and 2 below, the following procedure was used to investigate the release characteristics of lignocellulosic composites made with various isocyanate/co-additive binder compositions.

PLATEN RELEASE TEST PROCEDURE

A. Furnish Preparation

Aspen wafer board furnish (3"×1"×0.030") was passed twice through the hammermill and then screened. The +20 mesh fraction having a nominal particle size of ~10 mm×2 mm×0.030" was retained for use in the testing.

B. Disc Sample Preparation

For each binder evaluation, 100 grams of the above furnish were added to a Hobart "Kitchen Aid" mixer, and evenly distributed therein to maximize the exposed surface of the furnish. The binder was then uniformly applied over the furnish surface and the resulting mixture was blended for about 5 minutes.

10.0 grams of the blended furnish/binder mixture was formed into a uniform 4" diameter circular mat on the cleaned surface of a 6"×6"×0.030" sheet of 3003 alloy, H-19 temper aluminum, and a second, identical aluminum sheet was then placed over the mat. The mat-/aluminum sheets assembly was placed between the press platens of a compression molding machine, the platens having been preheated to a temperature of 350° F. The press was quickly closed, and the mat pressure was uniformly increased to 189 psi in 60 sec. The mat pressure was held at 189 psi for 30 sec, and then lowered to 47 psi and held at this pressure for a total pressing time of 5 minutes. After the 5 minutes, the pressure was released and the sandwich of aluminum sheets and compressed mat or disc was removed from the press.

EXAMPLE 1

Lignocellulosic discs were prepared from aspen wafer-board furnish according to the above "Platen Release Test Procedure" utilizing various organic polyisocyanate/co-additive binder combinations.

The organic polyisocyanate was Mondur MR, a commercial polymethylene polyphenyl isocyanate available from Mobay Chemical Corporation, and the co-additive for each binder composition tested is shown in the following Table I. The polyisocyanate constituted 75 percent and the co-additive constituted 25 percent of each binder composition. The wafer furnish was treated sequentially by application of polyisocyanate first followed by the co-additive component for a total binder level of 2.75 percent, based on weight of the furnish, i.e., per 100 g furnish at normal equilibrium moisture content (ca 5%).

After removal of the sandwich of aluminum sheets and compressed disc from the press, the disc was separated from the aluminum sheets. The release was rated as "good" if the disc was easily removed from the aluminum test plates, and "poor" when there was pronounced sticking leading to partial destruction of the disc upon removal by a spatula.

The release test results of Table I show that use of the binders containing a carboxylic acid co-additive led to good release whereas use of the co-additives without any carboxyl group gives poor release. Compounds with essentially equivalent molecular structures but without the —CO$_2$H functionality, such as esters, do not produce good release. For example, stearic acid gives good platen release properties to the pressed disc whereas methyl stearate does not:

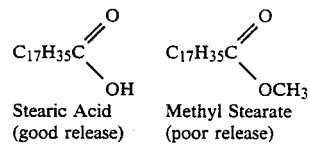

Stearic Acid (good release)  Methyl Stearate (poor release)

Also, Cromon D-1, a mono fatty acid blend from tall oil gives good release while Sylfat MM, a mixture of the methyl esters of stearic and oleic acids, gives poor release. Table I shows a repetition of these results when other analogous co-additive binder structures were evaluated, differing primarily in functional group from the carboxylic acids. Other non-reactive conventional waxes were evaluated and gave poor release as compared to the carboxylic acid co-additives.

TABLE I

RELEASE RESULTS FOR ISOCYANATE/CO-ADDITIVE BINDERS

| CO-ADDITIVE | | | | |
|---|---|---|---|---|
| Name | Type | Functional Group (s) | Supplier | RELEASE RESULTS |
| 2-Ethylhexanoic | C-8 Carboxylic Acid | —CO$_2$H | Union Carbide Corp. | Good |

TABLE I-continued
RELEASE RESULTS FOR ISOCYANATE/CO-ADDITIVE BINDERS

| Name | Type | Functional Group (s) | Supplier | RELEASE RESULTS |
|---|---|---|---|---|
| Acid | | | | |
| Emery 621 | C-12 Coconut Fatty Acid | —$CO_2H$ | Emery Industries Inc. | Good |
| Stearic Acid | C-18 Fatty Acid | —$CO_2H$ | Witco Chemical Corp. | Good |
| Oleic Acid | C-18 Unsaturated Fatty Acid | —$CO_2H$ | Witco Chemical Corp. | Good |
| Cromon D-1[1] | 100% Mixed Monomeric Fatty Acids | —$CO_2H$ | Sylvachem Corp. | Good |
| Arizona 7002[2] | 53% Dimeric Fatty Acids | (—$CO_2H)_2$ | Arizona Chemical Co. | Good |
| Crodym MX[3] | 81% Dimeric Fatty Acids | (—$CO_2H)_2$ | Sylvachem Corp. | Good |
| Empol-1010[4] | 94% Dimeric Fatty Acids | (—$CO_2H)_2$ | Emery Industries Inc. | Good |
| Empol-1040[5] | 85% Trimeric Fatty Acids | (—$CO_2H)_3$ | Emery Industries Inc. | Good |
| JWRC 520-206[6] | Extended Aromatic/Aliphatic Polyacid | (—$CO_2H)_2$ | Jim Walter Research Corp. | Good |
| JWRC 520-216[7] | Extended Aliphatic Polyacid | (—$CO_2H)_2$ | Jim Walter Research Corp. | Good |
| Methyl Stearate | Fatty Acid ester | (—$COOCH_3$) | Witco Chemical Corp. | Poor |
| Sylfat MM | Mixed Fatty Acid Esters | (—$COOCH_3$) | Sylvachem Corp. | Poor |
| Coramine 140 | Dimer Acid Diamine | (—$NH_2)_2$ | Expo Chemical Co. | Poor |
| Alkamide 1522 | Coconut (C-12) Alkanolamine/Alkanolamide | —$COON (ROH)_2$/—$N (ROH)_2$ | Alkaril Chemical Co. | Poor |
| JWRC 520-117 | Monomeric Fatty Acid Diethanolamide | [—$CON (CH_2CH_2OH)_2$] | Jim Walter Research Corp. | Poor |
| JWRC 521-250 | Dimer Acid DEG Ester | (—$COOCH_2CH_2$—$OCH_2CH_2OH$) | Jim Walter Research Corp. | Poor |
| JWRC Esters | Mixed Aromatic/Aliphatic DEG | (—$COOCH_2CH_2$—$OCH_2CH_2OH$) | Jim Walter Research Corp. | Poor |

Table I Footnotes:
[1] Acid No. = 175
[2] Acid No. = 130
[3] Acid No. = 190
[4] Acid No. = 195
[5] Acid No. = 183
[6] Acid No. = 83
[7] Acid No. = 72

EXAMPLE 2

The evidence shown in Example 1 indicated the superiority of carboxylic acids as release aids in isocyanate binders. However, since the test discs in this example were prepared by sequential addition of the isocyanate first and the co-additive next, variations in the viscosity or the physical state of the co-additive had the potential for causing unsatisfactory distribution onto the furnish. Premixing the isocyanate with the co-additive binder component before application to the furnish would help to avoid uneven distribution of the binder.

The test procedure of Example 1 was accordingly followed for the Mondur MR/co-additive binder compositions of the following Table III with the exception that the co-additive was intimately mixed with the isocyanate immediately prior to application to the furnish.

Additionally, the following refined release evaluation method was adopted to rate the extent to which the particularly co-additive for isocyanate reduced sticking of the test disc to the aluminum surface.

RELEASE EVALUATION METHOD

1. Controls for both extremes were established as follows:

(a) Extreme sticking

A disc prepared with a binder consisting of 100% Mondur MR at a level of 2.75% "on" the furnish, pressed as above described at 350° F., was found to be firmly bonded to the sheets upon removal from the press. The use of a 6" spatula to separate the aluminum sheets from the disc resulted in partial or complete destruction of the disc. Large amounts of the pressed fiber remained adhered to the sheets and it was not possible to remove an intact pressed disc. This category of sticking was labeled "Stuck Firmly".

(b) No sticking

A disc that gave total release behaved as follows: Upon raising the top press platen, the top aluminum sheet of the test "sandwich" could be picked up with tongs and removed without disturbing the remaining disc and lower aluminum sheet. Upon picking up the lower sheet and the pressed disc, a slight side-to-side jiggling motion caused the disc to slide or float around on the bottom aluminum sheet, This category was labeled "Float Free".

2. Pressed discs exhibiting release characteristics other than the two above-described extremes were judged as follows:

(a) If, upon raising the top press platen, either one or both aluminum sheets were lightly adhered to the disc, the following procedure was taken. The sheet(s) and the disc were picked up and held so that one edge was perpendicular to the work bench surface. Pressure was then exerted on the sheet to cause it to bend or "flex." If the lightly adhered disc separated cleanly from the aluminum sheet and fell off, this category was labeled "Release On Flexing".

(b) If the disc was adhered to one or both sheets and did not release from the disc on flexing, the tip of the spatula was placed under the extreme edge of the disc and a light twisting pressure was exerted. If from this effort alone the disc abruptly "popped" loose from the aluminum, this category was labeled "Nudge To Release".

(c) If nudging the disc with the spatula tip as in (b) above did not cause it to come loose, the spatula was slid further under the disc and worked around the disc as necessary to free it from the sheet. If only minimal spatula prying was needed, this category was labeled "Easy Pry Off".

(d) If the disc could not be removed with minimal effort as in (c) above, more pronounced effort was exerted. If the disc was removed as an essentially intact unit from the sheet, this category was labeled "Hard Pry Off". If the disc was not removable intact, however, the test result was called "Stuck Firmly" as for the 100% Mondur MR control.

The removal of the disc from the test sheets was accompanied by either no evidence of fiber left adhered to the sheets or varying degrees of stuck fiber up to the 100% Mondur MR control situation which was generally seen as 50% to 100% fiber remaining. An assessment of the ease of removal of the disc was therefore accompanied by an estimate of the amount of fibers left adhered to the aluminum sheet.

The six typical categories for platen release differentiation are as follows:

TABLE II

| Platen Release Category | Fibers Remaining | |
|---|---|---|
| | Notation | Estimated % |
| (1) Float Free | None | 0 |
| (2) Release on Flexing | Trace | ~1% |
| (3) Nudge to Release | Few | ~5% |
| (4) Easy Pry Off | Moderate | 5 to 10% |
| (5) Hard Pry Off | Much | 10 to 50% |
| (6) Stuck Firmly | Very Much | 50 to 100% | core-face, and pressed to a nominal thickness of 0.5 inch and a density of 42 lb/ft$^3$ at a platen temperature of 250° F.

B. Testing of Waferboards

Tests were carried out on the waferboards, and Table IV below shows a comparison of board properties for the different binders. The testing was in accordance with ASTM D1037-72, except that the following test sample sizes were utilized.

| TEST | ASTM SIZE 4' × 4' board | SAMPLE SIZE TESTED 2' × 2' board |
|---|---|---|
| A. Water Absorption (TS) | 12" × 12" | 4" × 6" and 4" × 12" |
| B. Static Bending (MOR) | 3" × 24 times thickness | 3" × 13" |
| C. Internal Bond (IB) | 2" × 2" | 2" × 2" |

B. Discussion of Results

As shown in Table IV, the polymeric fatty acid-/isocyanate binder yielded a much higher IB and about the same MOR as the monofunctional acid/isocyanate

TABLE III

RELEASE RESULTS FOR PRE-MIXED ISOCYANATE/CO-ADDITIVE* BINDERS

| | CO-ADDITIVE | | | RELEASE |
|---|---|---|---|---|
| Name | Type | Functional Group(s) | Supplier | RESULTS |
| Cromon D-1 | 100% Mixed Monomeric Fatty Acids | $-CO_2H$ | Sylvachem Corp. | Float Free |
| Crodym MX | 81% Dimeric Fatty Acids | $(-CO_2H)_2$ | Sylvachem Corp. | Float Free |
| Sylfat 393 | 57% Dimeric Fatty acids | $(-CO_2H)_2$ | Sylvachem Corp. | Float Free |
| Arizona 7002 | 53% Dimeric Fatty Acids | $(-CO_2H)_2$ | Arizona Chemical Co. | Float Free |
| JWRC 520-206 | Extended Aromatic/Aliphatic Polyacid | $(-CO_2H)_2$ | Jim Walter Research Corp. | Float Free |
| JWRC Esters | Mixed Aromatic/Aliphatic DEG Esters | $-COOCH_2CH_2-O-CH_2CH_2OH$ | Jim Walter Research Corp. | Stuck Firmly |
| Alkamide 1522 | Coconut Alkanolamine/Alkanolamide | $-COON(ROH)_2/-N(ROH)_2$ | Alkaril Chemical Co. | Hard Pry Off |
| Vikoflex 7170 | Epoxidized Soybean Oil | $-CH\overset{O}{\underset{}{\diagup\diagdown}}CH-$ | Viking Chemical Co. | Stuck Firmly |
| Vikoflex 7190 | Epoxidized Linseed Oil | $-CH\overset{O}{\underset{}{\diagup\diagdown}}CH-$ | Viking Chemical Co. | Hard Pry Off |

*75/25% Isocyanate/Co-Additive; 2.75% Total Binder

EXAMPLE 3

This example illustrates the production of waferboards using polyisocyanate/fatty acid compositions as the binder. Mondur MR was used as the isocyanate in combination with the monomeric and polymeric fatty acids of the following Table IV.

A. Preparation of Waferboards

Water furnish was rotated in a rotary blender and treated sequentially by spray application of isocyanate first followed by the fatty acid component. The binder level was 1.5% for each face of the waferbord and 2% for the core for an overall binder content of 1.75%. Each component addition required about 150 sec. Enough furnish was treated to make two 42 PCF density boards at 22×20×0.5 in. for each binder of Table IV. Since a viscosity range of 80-500 cps was required for spray application, the feed tank temperatures and hence spray temperatures were adjusted to attain suitable viscosities for spraying. After binder application, the treated furnish was felted in the sequence of face-binder. Both binder compositions gave about the same thickness swell values, and good release from the platens, whereas the 100% Mondur MR binder caused extreme adhesion to the platens.

TABLE IV

MONOMERIC VS. DIMERIC FATTY ACIDS IN ISOCYANATE BONDED WAFERBOARD

| Fatty Acid[1] | Binder Index | Waferboard Strength psi | | Waferboard Thickness Swell, % 24 Hr. Soak |
|---|---|---|---|---|
| | | MOR | IB | |
| Cromon D-1[2] | 7.2 | 3493 | 31 | 32 |
| Crodym MX[3] | 6.8 | 3504 | 51 | 39 |
| None[4] | ∞ | 4218 | 53 | 36 |

[1]25% of binder.
[2]Blend of saturated and unsaturated monomeric fatty acids, 319 g/CO$_2$H (Sylvachem Corp.)
[3]Blend of dimeric and trimeric fatty acids, 300 g/CO$_2$H (Sylvachem Corp.)
[4]Binder = 100% Mondur MR.

EXAMPLE 4

This example illustrates the use of fatty acids as external release agents in conjunction with isocyanate binders in the production of waferboards. Mondur MR was used as an internal isocyanate binder in combination with the monomeric and polymeric fatty acids of the following Table V.

case of the polymeric release agents. Therefore, the latter agents are seen to enhance board strength as compared to the monoacid.

TABLE V

SURFACE RELEASE COMPOSITION VS. BOARD PROPERTIES AND MOR GRADIENTS

| Surface Release Agent | | | Board Properties | | | |
|---|---|---|---|---|---|---|
| Type | Amount, Acid Equivalent/ft$^2$ | Release Characteristics | Sample Tested | Density, pcf | MOR, psi | MOR Gradients |
| Monoacid[1] | .0018 | Sticking; fiber pull; solid, wax-like residue on platen | Full board | 43.2 | 4095 | MOR increases as surface layers removed |
| | | | .025 in. removed | 38.4 | 4205 | |
| | | | .050 in. removed | 40.4 | 4205 | |
| Polyacid[2] | .0024 | No sticking; no fiber pull; wax-like residue on platen | Full board | 43.6 | 4930 | MOR decreases as surface layers removed |
| | | | .025 in. removed | 39.2 | 4340 | |
| | | | .050 in. removed | 39.4 | 4310 | |
| Extended Polyacid[3] | .0013 | No sticking; no fiber pull; slight film formation on platen | Full board | 44.6 | 5500 | MOR decreases as surface layers removed |
| | | | .025 in. removed | 40.5 | 5100 | |
| | | | .050 in. removed | 38.2 | 3950 | |

[1] 90/10% Oleic/Stearic Acids
[2] 53% Dimeric Fatty Acids (arizona 7002)
[3] Extended Aliphatic Polyacid (Jim Walter Research Corp.)

A. Preparation of Waferboards

Wafer furnish was rotated in a rotary blender and The isocyanate level was 1.5% for each face of the waferboard and 2% for the core for an overall isocyanate content of 1.75%. The isocyanate addition required about 150 sec. Enough furnish was treated to make two 42 PCF density boards at 22×20×0.5 in. for each isocyanate/fatty acid combination of Table V.

After the isocyanate binder application, the treated furnish was felted into mats in the sequence of face-core-face.

Before the pressing operation, the press platens were sanded and washed with methylene chloride solvent. The fatty acid, which was heated to provide a workable viscosity in the 80–500 cps range, was then wiped neat on the cleaned surfaces of the platens in the amount shown in Table V. The felted furnish was pressed to a nominal thickness of 0.5 inch for 4 minutes at a platen temperature of 350° F.

B. Testing

The nature of the release for each of the fatty acid materials is shown in Table V. While the monofunctional fatty acid blend gave sticking and fiber pull from the waferboards, the polymeric fatty acid and the extended polymeric fatty acid gave good release.

The density of the resultant waferboards was determined and they were tested for static bending (MOR) as described in Example 3. Each major surface of replicate board specimens was sanded to remove 0.025 in (0.05 in total), and the sanded boards were tested again for MOR and density. Additional replicates were sanded to remove 0.050 in (0.10 in total) from each major surface, and the testing was repeated.

As shown in Table V, the MOR for the unsanded boards using the polymeric and extended polymeric fatty acids was superior to that of the boards made with the monomeric fatty acid. In addition, the MOR increased as the surface layers were removed in the case of the board samples made with the monoacid release agent, indicating that this agent decreased the board strength at the surface. On the other hand, the MOR values decreased as the surfaces were removed in the

EXAMPLE 5

This example illustrates the use of both emulsified and neat polymeric fatty acid in conjunction with an isocyanate binder in the production of waferboards.

A. Emulsion Preparation

Triethanolamine (22.7 parts) was dissolved in water (453.5 parts), heated to 180° F. and placed in a homogenizer and then 2 parts of a petroleum-based defoamer (Foamaster VL, Diamond Shamrock Co.) was added with stirring. 429 parts of a dimer acid blend (Westvaco 1500, Westvaco Corp.) was heated to about 180° F. and then slowly poured into the vortex of the stirred mixture, followed by additional stirring for 2–3 minutes. The resultant emulsion was then cooled to about 125° F. The emulsion contained about 50% solids and its viscosity was about 500 cps at 25° C.

B. Preparation of Waferboards

Waferboards were prepared essentially as described in Example 4, except that after application of the Mondur MR binder and formation of the mats, both the mat surfaces and press platens were treated with the above emulsified dimer acid blend and in a separate run with the unemulsified dimer acid blend, which was heated to provide a workable viscosity in the 80–500 cps range. The amounts of external fatty acid release agents employed are shown in the following Table VI.

Before application of the release agents, the press platens were sanded and washed with methylene chloride solvent. The felted furnish was pressed for 4 minutes at a platen temperature of 350° F. to a nominal thickness of 0.5 inch and the density shown in Table VI.

C. Testing

The nature of the release for the boards is given in Table VI. Both the emulsified and neat polymeric fatty acids provided good release. The density of the resultant waferboards was determined and they were tested for static bending (MOR) as described in Example 3, yielding the results shown in the Table.

In a large scale manufacturing operation wherein waferboard mat surfaces were sprayed with the above emulsified polymeric fatty acid, excellent release was provided and adherent carbonaceous matter resulting from previously employed non-reactive release agents was gradually removed from the platens.

TABLE VI
FATTY ACID AS RELEASE AGENT IN WATERBOARD PRODUCTION

| Surface Release Agent | | Board Properties | | |
|---|---|---|---|---|
| | Amount, Acid | Release | Density, | MOR, |
| Emulsified Fatty Polyacid | .0023–.0046 | No sticking; | 44.1 | 5649 |
| Neat Fatty Polyacid | .0023–.0046 | No sticking; no fiber pull | 42.7 | 5523 |

We claim:

1. A synthetic board comprising lignocellulosic material bonded together with a binder comprising (a) an organic polyisocyanate and (b) a fatty material selected from the group consisting of a polyfunctional polymeric fatty acid, a chain-extended polycarboxyl compound containing a polymeric fatty radical and mixtures thereof, the acid number of the fatty material being in the range from about 30–250, and the chain-extended polycarboxyl compound being the reaction product of a polyfunctional polymeric fatty acid with at least one other compound having at least two active hydrogen groups, the acid equivalents employed in the preparation of the chain-extended polycarboxyl compound being in excess relative to the equivalents of the other active hydrogen group-containing compound or compounds employed in the preparation.

2. The synthetic board of claim 1 wherein the lignocellulosic material is bonded together to form a member selected from the group consisting of a waferboard, an oriented waferboard and an oriented strand board.

3. In a multilayered waferboard panel comprising wood wafers bonded together with adhesive resin, the improvement wherein the layers formed on both major surfaces of the panel are bonded together with the binder of claim 1.

4. The synthetic board of claim 1 wherein the polyisocyanate is a polymethylene polyphenyl polyisocyanate.

5. The synthetic board of claim 4 wherein the binder includes at least one additional compound having at least one group which is reactive with isocyanate.

6. The synthetic board of claim 4 wherein the fatty material comprises a polymeric fatty acid selected from the group consisting of dimerized fatty acids, trimerized fatty acids, higher polymers of fatty acids and mixtures thereof.

7. The synthetic board of claim 6 wherein the polymeric fatty acid is derived from unsaturated $C_{18}$ fatty acids and comprises about 0 to 15 weight percent of $C_{18}$ monobasic acids, 50 to 96 weight percent of $C_{36}$ dibasic acids and 4 to 35 weight percent of higher polybasic acids.

8. The synthetic board of claim 4 wherein the fatty material comprises a chain-extended polycarboxyl compound containing a polymeric fatty radical, the chain-extended polycarboxyl compound being the reaction product of (a) a polymeric fatty acid selected from the group consisting of dimerized fatty acids, trimerized fatty acids, higher polymers of fatty acids and mixtures thereof, and (b) at least one other compound having at least two active hydrogen groups, the acid equivalents employed in the preparation of the chain-extended polycarboxyl compound being in excess relative to the equivalents of the other active hydrogen group-containing compound or compounds employed in the preparation.

9. The synthetic board of claim 8 wherein the polymeric fatty acid is derived from unsaturated $C_{18}$ fatty acids and comprises about 0 to 15 weight percent of $C_{18}$ monobasic acids, 50 to 96 weight percent of $C_{36}$ dibasic acids and 4 to 35 weight percent of higher polybasic acids.

10. The synthetic board of claim 8 wherein reactant (b) comprises a member selected from the group consisting of glycols, diamines, aminoalcohols, mixtures thereof, and mixtures of the glycols, diamines and aminoalcohols with acidic compounds selected from the group consisting of dicarboxylic acids, dicarboxylic acid anhydrides and dicarboxylic acid esters.

11. The synthetic board of claim 8 wherein reactant (b) comprises a glycol.

* * * * *